United States Patent
O'Reilly et al.

(10) Patent No.: US 9,917,475 B2
(45) Date of Patent: Mar. 13, 2018

(54) VARIABLE NEUTRAL IMPEDANCE FOR MULTI-SOURCE SYSTEM

(71) Applicant: Eaton Corporation, Cleveland, OH (US)

(72) Inventors: Daniel Patrick O'Reilly, Monroeville, PA (US); David Doyle Shipp, Murrysville, PA (US)

(73) Assignee: Eaton Corporation, Cleveland, OH (US)

( * ) Notice: Subject to any disclaimer, the term of this patent is extended or adjusted under 35 U.S.C. 154(b) by 565 days.

(21) Appl. No.: 14/522,950

(22) Filed: Oct. 24, 2014

(65) Prior Publication Data
US 2015/0130280 A1 May 14, 2015

Related U.S. Application Data

(60) Provisional application No. 61/901,697, filed on Nov. 8, 2013.

(51) Int. Cl.
| | |
|---|---|
| *H02J 7/00* | (2006.01) |
| *H02J 9/00* | (2006.01) |
| *H02J 9/06* | (2006.01) |
| *H02J 3/38* | (2006.01) |

(52) U.S. Cl.
CPC .............. *H02J 9/066* (2013.01); *H02J 3/38* (2013.01); *Y10T 307/62* (2015.04); *Y10T 307/658* (2015.04); *Y10T 307/696* (2015.04)

(58) Field of Classification Search
CPC ......... H02J 9/066; H02J 3/38; Y10T 307/696; Y10T 307/658; Y10T 307/62
See application file for complete search history.

(56) References Cited

U.S. PATENT DOCUMENTS

| | | | |
|---|---|---|---|
| 6,634,303 B1 * | 10/2003 | Madsen ................. | B60L 3/102 105/73 |
| 7,816,813 B2 * | 10/2010 | Yagudayev ............... | H02J 3/40 307/64 |

(Continued)

OTHER PUBLICATIONS

Al-Tayle et al; *AC Generators with $2/3^{rd}$ and $5/6^{th}$ Winding Pitch*, Generator Technologies, Issue #WP105: Technical Information from Cummins Generator Technologies, 2013; 12 pages.

(Continued)

*Primary Examiner* — Jared Fureman
*Assistant Examiner* — Esayas Yeshaw
(74) *Attorney, Agent, or Firm* — Ward and Smith, P.A.

(57) ABSTRACT

A system includes a first power source and a variable neutral impedance circuit configured to vary a neutral impedance of the first power source based on presence and absence of a parallel coupling of the first power source with a second power source. The variable neutral impedance circuit may be configured to reduce a neutral current of the first power source when the first power source is operating in parallel with the second power source. The variable neutral impedance circuit may include an impedance coupled in series with the first power source, a bypass switch configured to bypass the impedance and a control circuit configured to control the bypass switch. The impedance may include a resistor.

19 Claims, 2 Drawing Sheets

(56) References Cited

U.S. PATENT DOCUMENTS

| | | | | |
|---|---|---|---|---|
| 2006/0028069 A1* | 2/2006 | Loucks | ............... | H02J 3/005 307/130 |
| 2009/0072797 A1* | 3/2009 | Yao | ............... | H02P 9/10 322/19 |
| 2009/0224599 A1* | 9/2009 | Yue | ............... | H02J 1/10 307/9.1 |
| 2010/0001698 A1* | 1/2010 | Johnson | ............... | H02J 3/1864 323/209 |
| 2010/0124087 A1* | 5/2010 | Falk | ............... | H02M 1/36 363/131 |
| 2010/0148588 A1* | 6/2010 | Algrain | ............... | H02P 5/50 307/84 |
| 2010/0156361 A1* | 6/2010 | Barrenscheen | ............... | H02M 3/1584 323/272 |
| 2010/0271074 A1* | 10/2010 | Murashima | ............... | H03K 5/24 327/60 |
| 2012/0049640 A1* | 3/2012 | Ichikawa | ............... | H02J 5/005 307/99 |
| 2012/0236606 A1* | 9/2012 | Mazzoli | ............... | H02J 3/01 363/39 |
| 2013/0002368 A1* | 1/2013 | Zhu | ............... | H03H 7/40 333/32 |
| 2016/0333856 A1* | 11/2016 | Zabalza | ............... | H02H 7/06 |

OTHER PUBLICATIONS

Hoevenaars; *Preventing Neutral Circulating Currents when Paralleling Generators*, Mirus International Inc., White Paper: DPNL-WP001-A1, Aug. 11, 2011 (11 pages) at www.cumminsgeneratortechnologies.com.

* cited by examiner

VARIABLE NEUTRAL IMPEDANCE FOR MULTI-SOURCE SYSTEM

RELATED APPLICATION

The present application claims priority from U.S. Provisional Application No. 61/901,697 entitled "VARIABLE NEUTRAL IMPEDANCE FOR MULTI-GENERATOR SYSTEM," filed on Nov. 8, 2013 and incorporated herein by reference in its entirety.

BACKGROUND

The inventive subject matter relates to power systems and methods of operating the same and, more particularly, to multi-source power systems and methods and operating the same.

Some power system applications use multiple generators configured to serve a load in parallel. For example, in data center applications, a set of parallel connected emergency backup generators may be used to supply power to equipment in the event of a failure of a utility power supply. If such generators each have low impedance ground connections and do not have the same winding pitch design, significant third harmonic currents might be generated in the neutral conductors of some of the generators. Such ground current may cause unwanted tripping of switchgear or protective devices, generator control malfunction and may require derating of some of the generators.

SUMMARY

Some embodiments of the inventive subject matter provide a system including a first power source and a variable neutral impedance circuit configured to vary a neutral impedance of the first power source based on presence and absence of a parallel coupling of the first power source with a second power source. The variable neutral impedance circuit may be configured to reduce a neutral current of the first power source when the first power source is operating in parallel with the second power source.

In some embodiments, the variable neutral impedance circuit may include an impedance coupled in series with the first power source, a bypass switching device configured to bypass the impedance and a control circuit configured to control the bypass switching device. The impedance may include a resistor.

In some embodiments, the first and second power sources may include respective first and second backup generators. The first and second generators may have different winding pitches. In further embodiments, the second power source may include a utility power source.

Further embodiments of the inventive subject matter provide a system including a first generator and a second generator configured to be coupled in parallel and a variable neutral impedance circuit configured to change a neutral impedance of the first generator responsive to a status of a connection between the first generator and the second generator. The variable neutral impedance circuit may be configured to provide a first neutral impedance when the first and second generators are operating in parallel and to provide a second neutral impedance when the first generator is operating independently of the second generator.

Methods according to some embodiments including providing a first neutral impedance for a first power source when the first power source is operating in parallel with at least one second power source and providing a second neutral impedance for the first power source when the first power source is operating independently of the at least one second power source. The first neutral impedance may be configured to reduce a circulating neutral current of the first power source when the first power source is operating in parallel with the at least one second power source. Providing a first neutral impedance for a first power source when the first power source is operating in parallel with the at least one second power source may include providing a circuit component in series with neutral terminal of the first power source and providing a second neutral impedance for the first power source when the first power source is operating independently of the at least one second power source may include bypassing the circuit component. The circuit component may include a resistor.

DETAILED DESCRIPTION

Figure 1:
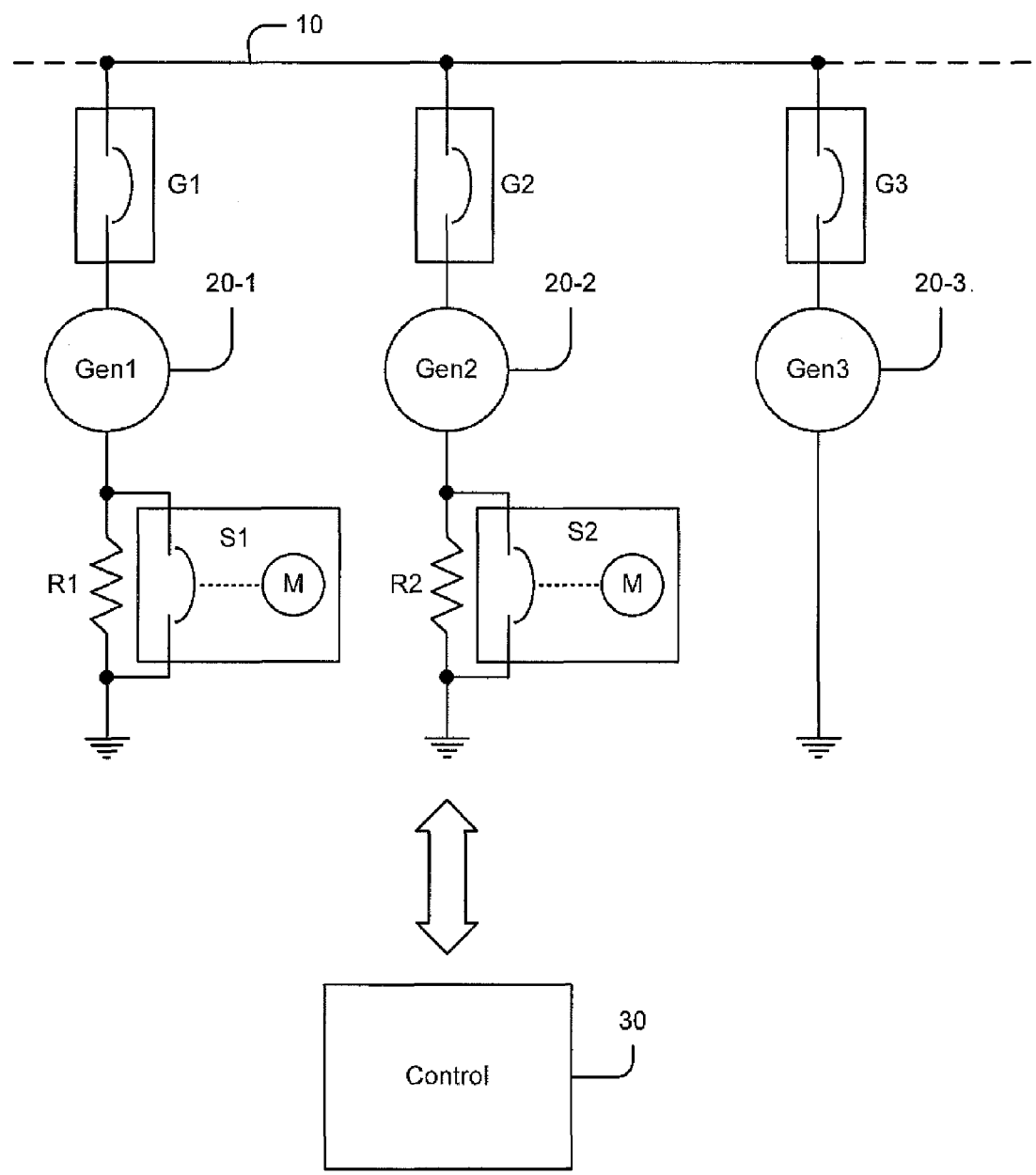
FIG. 1 illustrates a power system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a power system according to some embodiments. The power system includes first, second, and third generators 20-1, 20-2, 20-3, which are configured to be coupled to a bus 10 by respective breakers G1, G2, G3. The generators 20-1, 20-2, 20-3 may be, for example, a set of emergency backup generators used to supply power to the bus 10 in the event of a failure of a utility power supply. It will be appreciated that, in some embodiments, more than three generators may be used.

The first, second and third generators 20-1, 20-2, 20-3 may have different winding pitches. For example, the first and second generators 20-1, 20-2 may be ⅔rd pitch generators, while the third generator 20-3 may be a ⅝th pitch generator. Consequently, if the first generator 20-1 and/or the second generator 20-2 were to be coupled to ground using a low-impedance connection while coupled to the bus 10 in parallel with the third generator 20-3, significant third harmonic currents will be generated by the ⅝th pitch generator 20-3 diving circulating third harmonic currents in the neutral conductors of the ⅔rd pitch generators 20-1, 20-2. This could result in ground fault currents that might cause unwanted tripping of switchgear. The third harmonic currents might also necessitate derating of the ⅔rd pitch generators 20-1, 20-2.

According to some embodiments, such third harmonic currents may be reduced by placing resistors R1, R2 in the neutral paths of the ⅔rd pitch generators 20-1, 20-2 when either of these generators is coupled in parallel with the ⅝th pitch generator 20-3. The resistors R1, R2 may limit neutral currents and thus maintain normal operation within switchgear short circuit ratings. Because the ⅝th pitch generator 20-3 is directly grounded, line-to-neutral (single phase) loads may be properly served. According to further aspects, the resistors R1, R2 may be bypassed when either or both of the ⅔rd pitch generators 20-1, 20-2 is being operated with the ⅝th pitch generator 20-3 disconnected from the bus 10. As shown, such bypassing may be accomplished using, for example, motorized switches S1, S2. Bypassing the neutral resistor R1 or the neutral resistor R2 enables the corresponding first generator 20-1 or second generator 20-2 to properly supply single phase loads. A control circuit 30 may be configured to control the motorized switches S1, S2 responsive to a state of the ⅝th pitch generator 20-3. The control circuit 30 may include any of a variety of different arrangements of analog circuitry and/or digital circuitry, and may be configured to control and/or operate responsive to various components of the power system.

It will be appreciated that the above-describe techniques may be used in applications in which local generators (e.g., engine-generator sets) are operated in parallel with a utility source. For example, in some embodiments, the first generator 20-1 may be a Y-connected transformer coupled to a utility grid, while the second and third generators 20-2, 20-3 are local generators.

Figure 2:
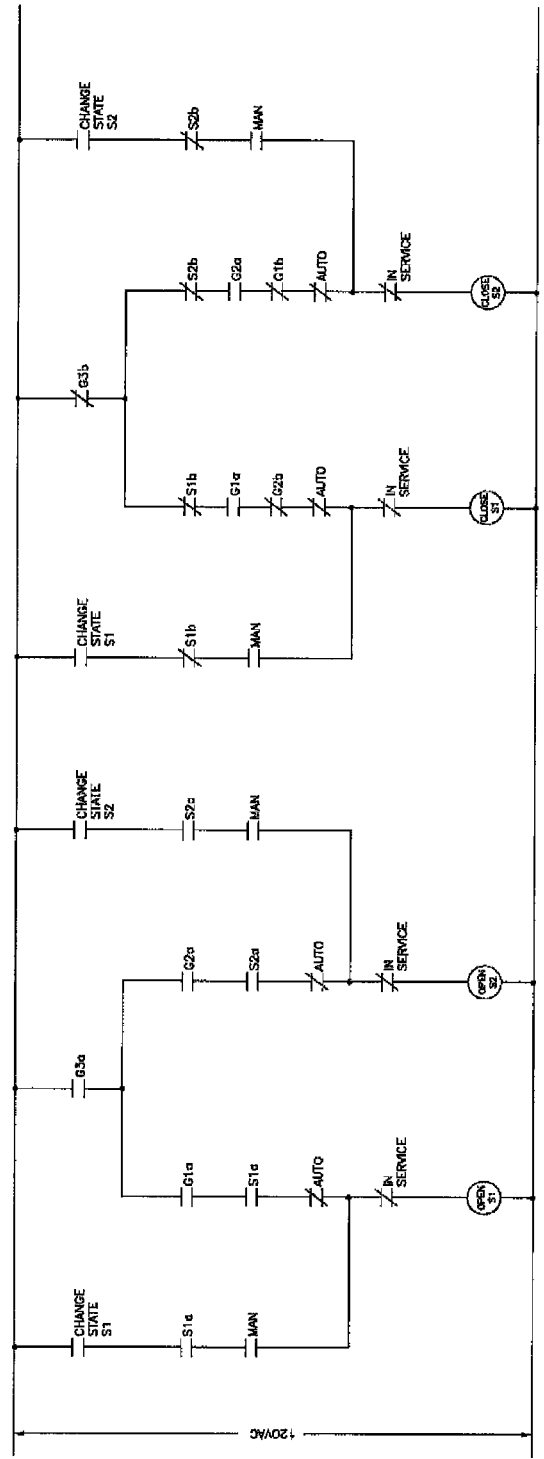
FIG. 2 illustrates an example of relay logic for implementation of the power system of FIG. 1 according to further embodiments.

FIG. 2 illustrates relay logic that may be used in such a control circuit according to some embodiments. Referring to the left side of the figure, starting at a state in which the ⅝th pitch generator 20-3 is disconnected from the bus (contact G3a of the breaker G3 open) and the first ⅔rd pitch generator 20-1 is connected to the bus 10 via the breaker G1 and the motorized switch S1 for the first generator 20-1 is closed, closure of the breaker G3 to connect the ⅝th pitch generator 20-3 to the bus 10 results in opening of the motorized switch S1, removing the bypass around the resistor R1 in the neutral path of the first ⅔rd pitch generator 20-1. A similar logic applies if the second ⅔rd pitch generator 20-2 is operating and the ⅝th pitch generator 20-3 is brought on line. If the ⅝th pitch generator 20-3 is decoupled from the bus 10 by opening the breaker G3 while either of the first and second ⅔rd pitch generators 20-1, 20-2 is still connected to the bus 10, the corresponding switch S1 and/or the switch S2 is closed, causing the neutral resistor R1 and/or the neutral resistor R2 to be bypassed.

It will be appreciated that the relay-based implementation shown in FIG. 2 is provided for purposes of illustration, and that other types of control circuitry may be used to similar effect in other embodiments. For example, control logic along the lines illustrated in FIG. 2 may be implemented using a programmable logic controller (PLC) or other computer-based control circuitry. It will be further appreciated that other bypassable impedances may be used for neutral connections along the lines discussed above, for example, combinations of resistors with other elements, such as inductors.

Embodiments of the inventive subject matter may provide several advantages. For example, some embodiments of the inventive subject matter may facilitate use of combinations of generators having different pitches and reduce or eliminate the need to derate generators in such applications.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed is:

1. A system comprising:
a first AC power source; and
a variable neutral impedance circuit configured to vary a neutral impedance of the first AC power source based on presence and absence of a parallel coupling of the first AC power source with a second AC power source.

2. The system of claim 1, wherein the variable neutral impedance circuit is configured to reduce a neutral current of the first AC power source when the first AC power source is operating in parallel with the second AC power source.

3. The system of claim 1, wherein the variable neutral impedance circuit comprises:
an impedance coupled in series with the first AC power source;
a bypass switch configured to bypass the impedance; and
a control circuit configured to control the bypass switch.

4. The system of claim 3, wherein the impedance comprises a resistor.

5. The system of claim 1, wherein the first and second AC power sources comprise respective first and second backup generators.

6. The system of claim 5, wherein the first and second generators have different pitches.

7. The system of claim 1, wherein the second AC power source comprises a utility power source.

8. A system comprising:
a first AC generator and a second AC generator configured to be coupled in parallel; and
a variable neutral impedance circuit configured to change a neutral impedance of the first AC generator responsive to a status of a connection between the first AC generator and the second AC generator.

9. The system of claim 8, wherein the variable neutral impedance circuit is configured to provide a first neutral impedance when the first and second AC generators are operating in parallel and to provide a second neutral impedance when the first AC generator is operating independently of the second AC generator.

10. The system of claim 8, wherein the first and second AC generators comprise respective backup generators configured to provide power in the event of failure of a utility source.

11. The system of claim 8, wherein the variable neutral impedance circuit comprises:
an impedance coupled in series with the first AC generator;
a bypass switch configured to bypass the impedance; and
a control circuit configured to control the bypass switch.

12. The system of claim 11, wherein the impedance comprises a resistor.

13. The system of claim 8, wherein the first and second AC generators have different pitches.

14. A method comprising:
providing a first neutral impedance for a first AC power source when the first power source is operating in parallel with a second AC power source; and
providing a second neutral impedance for the first AC power source when the first AC power source is operating independently of the second AC power source.

15. The method of claim 14, wherein the first neutral impedance is configured to reduce a neutral current of the first AC power source when the first AC power source is operating in parallel with the second AC power source.

16. The method of claim 14:
wherein providing a first neutral impedance for a first AC power source when the first AC power source is operating in parallel with a second AC power source comprises providing a circuit component in series with neutral terminal of the first AC power source; and
wherein providing a second neutral impedance for the first AC power source when the first AC power source is operating independently of the second AC power source comprises bypassing the circuit component.

17. The method of claim 16, wherein the circuit component comprises a resistor.

18. The method of claim 14, wherein the first and second AC power sources comprise respective first and second backup generators.

19. The method of claim 14, wherein the second AC power source comprises a utility power source.

* * * * *